US012594984B2

(12) United States Patent
Tamaizumi et al.

(10) Patent No.: US 12,594,984 B2
(45) Date of Patent: Apr. 7, 2026

(54) MOTOR CONTROL DEVICE

(71) Applicant: JTEKT CORPORATION, Kariya (JP)

(72) Inventors: Terutaka Tamaizumi, Okazaki (JP); Yufeng Lin, Iwata (JP); Hiromasa Tamaki, Okazaki (JP); Hidenori Itamoto, Tajimi (JP); Muhammad Iqmal Abd Rahim, Okazaki (JP); Atsuo Sakai, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 50 days.

(21) Appl. No.: 18/693,634

(22) PCT Filed: Sep. 28, 2021

(86) PCT No.: PCT/JP2021/035661
§ 371 (c)(1),
(2) Date: Mar. 20, 2024

(87) PCT Pub. No.: WO2023/053212
PCT Pub. Date: Apr. 6, 2023

(65) Prior Publication Data
US 2024/0391520 A1 Nov. 28, 2024

(51) Int. Cl.
*B62D 5/04* (2006.01)
(52) U.S. Cl.
CPC .................................... *B62D 5/046* (2013.01)
(58) Field of Classification Search
CPC ........... B62D 5/046; G05B 13/02; H02P 6/10;
H02P 21/13; H02P 21/20; H02P 23/04;
H02P 23/12; H02P 23/14; H02P 21/05
(Continued)

(56) References Cited

U.S. PATENT DOCUMENTS

2020/0223475 A1   7/2020   Tamaizumi et al.
2020/0382032 A1   12/2020   Takase et al.

FOREIGN PATENT DOCUMENTS

CN         105932920 A      9/2016
EP         3 598 632 A1     1/2020
(Continued)

OTHER PUBLICATIONS

Oct. 21, 2024 extended Search Report issued in European Patent Application No. 21959260.7.
(Continued)

*Primary Examiner* — Lindsay M Low
*Assistant Examiner* — Omar Morales
(74) *Attorney, Agent, or Firm* — Oliff PLC

(57) ABSTRACT

A motor control device controls a motor of a mechanical device. The motor control device includes a command value calculation unit that calculates a command value for controlling the motor, and a disturbance observer unit for estimating a disturbance applied to the mechanical device, based on the command value and rotation information of the motor, and to correct the command value based on the disturbance that is estimated. The disturbance observer unit has parameters that are adjusted to compensate for effects of the disturbance having a specific frequency that is an object of suppression. The parameters are adjusted such that a disturbance, applied to the mechanical device after effects of the disturbance are compensated for, has frequency characteristics corresponding to antiresonance characteristics of the mechanical device.

7 Claims, 2 Drawing Sheets

(58) Field of Classification Search
USPC .......................................................... 701/41
See application file for complete search history.

(56) References Cited

FOREIGN PATENT DOCUMENTS

| | | | | |
|---|---|---|---|---|
| JP | H07-123505 | A | 5/1995 | |
| JP | H09-074783 | A | 3/1997 | |
| JP | 2004-224129 | A | 8/2004 | |
| JP | 2008-228484 | A | 9/2008 | |
| JP | 2011-160574 | A | 8/2011 | |
| JP | 2020-111129 | A | 7/2020 | |
| WO | WO-2022070589 | A1 * | 4/2022 | .............. H02P 23/04 |

OTHER PUBLICATIONS

Nov. 22, 2021 International Search Report issued in International Patent Application No. PCT/JP2021/035661.
English Translation of Jun. 24, 2025 Office Action issued in JP Patent Application No. 2023-550797.

* cited by examiner

MOTOR CONTROL DEVICE

TECHNICAL FIELD

The present invention relates to a motor control device.

BACKGROUND ART

There conventionally is an electric power steering system. An electric power steering system (hereinafter referred to as "EPS") assists steering by a steering wheel, by applying torque from a motor to a steering mechanism. A control device of the EPS calculates a target current value according to steering torque applied to the steering wheel, and controls power feed to the motor, based on the target current value that is calculated. Thus, the motor generates torque corresponding to the steering torque.

In EPSs, vibrations generated due to torque ripple of the motor or reduction gear are readily conveyed to the steering wheel. Accordingly, torque differential control, such as described in Patent Document 1, for example, is performed. The control device calculates a torque differential value by differentiation of the steering torque detected by a torque sensor, and corrects the target current value in accordance with the torque differential value that is calculated. This suppresses vibrations due to torque ripple.

RELATED ART DOCUMENTS

Patent Documents

Patent Document 1: Japanese Unexamined Patent Application Publication No. 2004-224129 (JP 2004-224129 A)

SUMMARY OF THE INVENTION

Problem to be Solved by the Invention

Executing torque differential control certainly does enable suppression of vibrations caused by torque ripple. However, torque differential control may not be able to suppress vibrations due to torque ripple to a required level. Accordingly, there is demand to more appropriately suppress vibrations due to torque ripple. Also, motors are used as drive sources not only for electric power steering systems but also for various types of mechanical devices. There also is demand to reduce vibrations due to torque ripple in the motors of these mechanical devices as well.

Means for Solving the Problem

A motor control device according to an aspect of the present disclosure controls a motor of a mechanical device. The motor control device includes a command value calculation unit configured to calculate a command value for controlling the motor, and a disturbance observer unit configured to estimate a disturbance applied to the mechanical device, based on the command value and rotation information of the motor, and to correct the command value based on the disturbance that is estimated. The disturbance observer unit has a parameter that is adjusted to compensate for effects of the disturbance having a specific frequency that is an object of suppression. The disturbance that is applied to the mechanical device after the effects of the disturbance have been compensated for is a post-compensation disturbance, and the parameter is adjusted such that the disturbance following compensation for the disturbance has a frequency characteristic corresponding to an antiresonance characteristic of the mechanical device.

MODES FOR CARRYING OUT THE INVENTION

A motor control device 11 according to an embodiment will be described.

Figure 1:
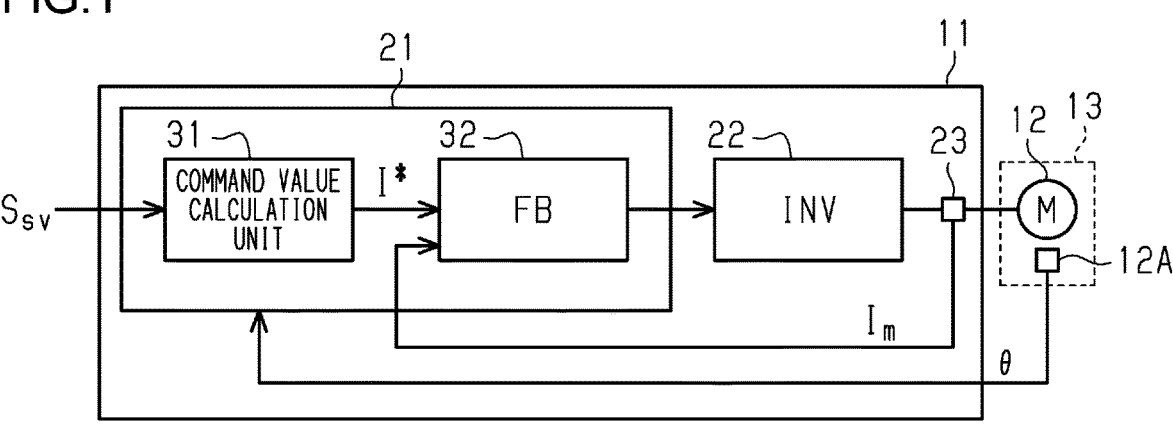
FIG. 1 is a configuration diagram of an embodiment of a motor control device.

As illustrated in FIG. 1, the motor control device 11 controls a motor 12. The motor 12 generates torque for driving a mechanical device 13 in which the motor 12 is to be installed. The motor 12 is, for example, a three-phase brushless motor. The motor 12 has a rotation angle sensor 12A. The rotation angle sensor 12A detects a rotation angle $\theta$ of the motor 12. The rotation angle $\theta$ of the motor 12 is rotation information of the motor 12.

The motor control device 11 has a microcomputer 21, an inverter 22, and a current sensor 23.

The microcomputer 21, which is a processing circuit, has a command value calculation unit 31 and a feedback calculation unit 32. These calculation units are functional parts realized by a CPU (central processing unit) of the microcomputer 21 executing a control program. The microcomputer 21 includes memory that stores the control program. The memory includes computer-readable media such as RAM (Random Access Memory) and ROM (Read Only Memory). However, each calculation unit being realized by software is only an example, and at least part of the calculation units may be realized by a hardware circuit such as a logic circuit.

The command value calculation unit 31 calculates a current command value I* for the motor 12 based on a state variable $S_{SV}$ indicating a state of the mechanical device 13, for example. The feedback calculation unit 32 calculates a difference between the current command value I* calculated by the command value calculation unit 31 and a value of a current Im of the motor 12 detected by way of the current sensor 23. The feedback calculation unit 32 generates a drive signal for the inverter 22 so as to eliminate the difference between the current command value I* and the value of the current Im of the motor 12.

The inverter 22 operates based on the drive signal generated by the feedback calculation unit 32. The inverter 22 has a plurality of switching elements. By switching these switching elements based on the drive signal, electric power according to the current command value I* is generated. The electric power generated by the inverter 22 is supplied to the motor 12 via a power supply path made up of a bus bar, a cable, or the like. Thus, the motor 12 generates torque corresponding to the current command value I*.

\<Disturbance Observer\>

Figure 2:
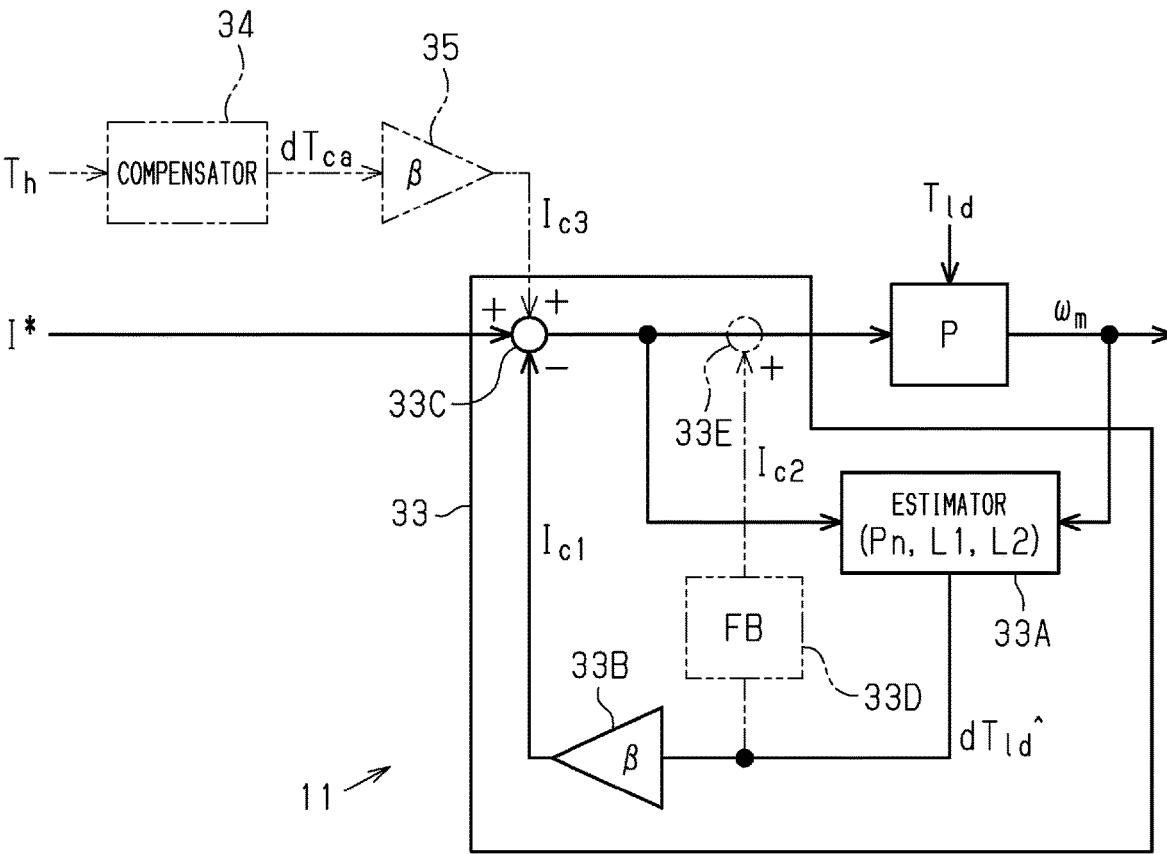
FIG. 2 is a block diagram of the motor control device in FIG. 1.

As illustrated in the block diagram of FIG. 2, the motor control device 11 has a disturbance observer unit 33. The disturbance observer unit 33 is provided to estimate a disturbance $T_{ld}$ that is applied to a plant P, which is an object of control, and to compensate for effects of the disturbance $T_{ld}$. Compensation for the effects of disturbance refers to reducing the effects of disturbance by taking into account characteristics of the disturbance when controlling a system that is subject to disturbance. The disturbance $T_{ld}$ is nonlinear torque. The disturbance $T_{ld}$ is, for example, a torque ripple of the motor 12. Torque ripple is a disturbance that occurs periodically as the motor 12 rotates.

A control system for the motor 12 is a feedback control system that determines the current command value I* for the motor 12 based on the state variable $S_{SV}$ of the mechanical device 13. Supplying current from the inverter 22 to the motor 12 in accordance with the current command value I* rotates the motor 12 at a predetermined angular velocity $\omega_m$. Therefore, a range from the current command value I* for the motor 12, to the angular velocity $\omega_m$ of the motor 12, is the object of control target in the feedback control system. The angular velocity $\omega_m$ of the motor 12 is rotation information of the motor 12. The plant P includes the mechanical device 13.

When the inertial number of the mechanical device 13 is "1", and the mechanical device 13 and the motor 12 are regarded as being connected via an elastic element, the object of control can be regarded as being a two-inertial system in which two moments of inertia are connected by the elastic element. In this case, the object of control has frequency characteristics that include one set of resonance characteristics and antiresonance characteristics.

Also, when the inertial number of the mechanical device 13 is "2", and the mechanical device 13 and the motor 12 are regarded as being connected via an elastic element, the object of control can be regarded as being a three-inertial system in which three moments of inertia are connected by the elastic element. In this case, the object of control has frequency characteristics that include two sets of resonance characteristics and antiresonance characteristics.

The disturbance observer unit 33 takes in the current command value I*, which is a target value of the plant P, and output of the plant P. An example of the output of the plant P is the angular velocity $\omega_m$ of the motor 12. The angular velocity $\omega_m$ is obtained by differentiation of the rotation angle θ of the motor 12 that is detected by the rotation angle sensor 12A. The disturbance observer unit 33 estimates the disturbance $T_{ld}$ based on the current command value I* and the angular velocity $\omega_m$ of the motor 12. The disturbance observer unit 33 calculates a first correction value $I_{c1}$ for canceling out the disturbance $T_{ld}$ having a frequency that is the object of suppression.

The disturbance observer unit 33 has an estimator 33A, a multiplier 33B, and a subtractor 33C. The disturbance observer unit 33 may be made up of a hardware circuit, such as a logic circuit. The disturbance observer unit 33 is also referred to as a disturbance observer circuit. Also, the disturbance observer unit 33 may be a functional part realized by a CPU of a computer executing a control program.

The estimator 33A has a nominal plant Pn, a first observer gain L1, and a second observer gain L2. The nominal plant Pn is a model simulating the plant P that is the object of control. The estimator 33A calculates a difference $\Delta\omega$ between the angular velocity $\omega_m$ of the motor 12 obtained as the output of the plant P, and an estimated angular velocity $\omega_m^\wedge$ of the motor 12 obtained as output of the nominal plant Pn, as shown in the following Expression (1). The "^" indicates an estimated value.

$$\Delta\omega = \omega_m - \omega_m{}^\wedge \qquad (1)$$

4

The estimator 33A multiplies the value of the difference $\Delta\omega$ between the angular velocity $\omega_m$ of the motor 12 and the estimated angular velocity $\omega_m^\wedge$ of the motor 12 by the second observer gain L2, as shown in the following Expression (2), thereby calculating a differential value $dT_{ld}^\wedge$ of an estimated disturbance $T_{ld}^\wedge$.

$$dT_{ld}{}^\wedge = \Delta\omega \cdot L2 \qquad (2)$$

Note that the estimator 33A calculates the estimated disturbance $T_{ld}^\wedge$ by integration of the differential value $dT_{ld}^\wedge$ of the estimated disturbance $T_{ld}^\wedge$. The nominal plant Pn calculates an estimated value $\omega_m^\wedge$ of the angular velocity $\omega_m$ using the estimated disturbance $T_{ld}^\wedge$, a value obtained by multiplying the value of the difference $\Delta\omega$ by the first observer gain L1, and a viscosity coefficient C of the motor 12.

The multiplier 33B calculates the first correction value $I_{c1}$ by multiplying the differential value $dT_{ld}^\wedge$ of the estimated disturbance $T_{ld}^\wedge$ calculated by the estimator 33A, by a gain β. The first correction value $I_{c1}$ is a current value for canceling out the vibration due to the disturbance $T_{ld}$.

The subtractor 33C subtracts the first correction value $I_{c1}$ from the current command value I* to calculate a current command value I* in which the effects of the disturbance $T_{ld}$ have been compensated for.

The disturbance $T_{ld}$ that is applied to the mechanical device 13 after the effects of the disturbance $T_{ld}$ have been compensated for by the disturbance observer unit 33 is referred to as post-compensation disturbance $T_{last}$.

The post-compensation disturbance $T_{last}$ is expressed by the following Expression (3).

$$T_{last} = T_{ld} - \beta \cdot dT_{ld}{}^\wedge = \{Js^2 + (-L2 \cdot \beta) + L1 \cdot J)s + L2\} \cdot T_{ld}$$
$$/\{Js^2 + (-L2 \cdot C + L1 \cdot J)s + L2\} \cdot Js \qquad (3)$$

where "J" is a coefficient of inertia in which a moment of inertia of the mechanical device 13 is modeled, "C" is a viscosity coefficient in which friction of the mechanical device 13 is modeled, "s" is a Laplace operator, "L1" is first observer gain, "L2" is second observer gain, and "β" is gain.

Figure 3:
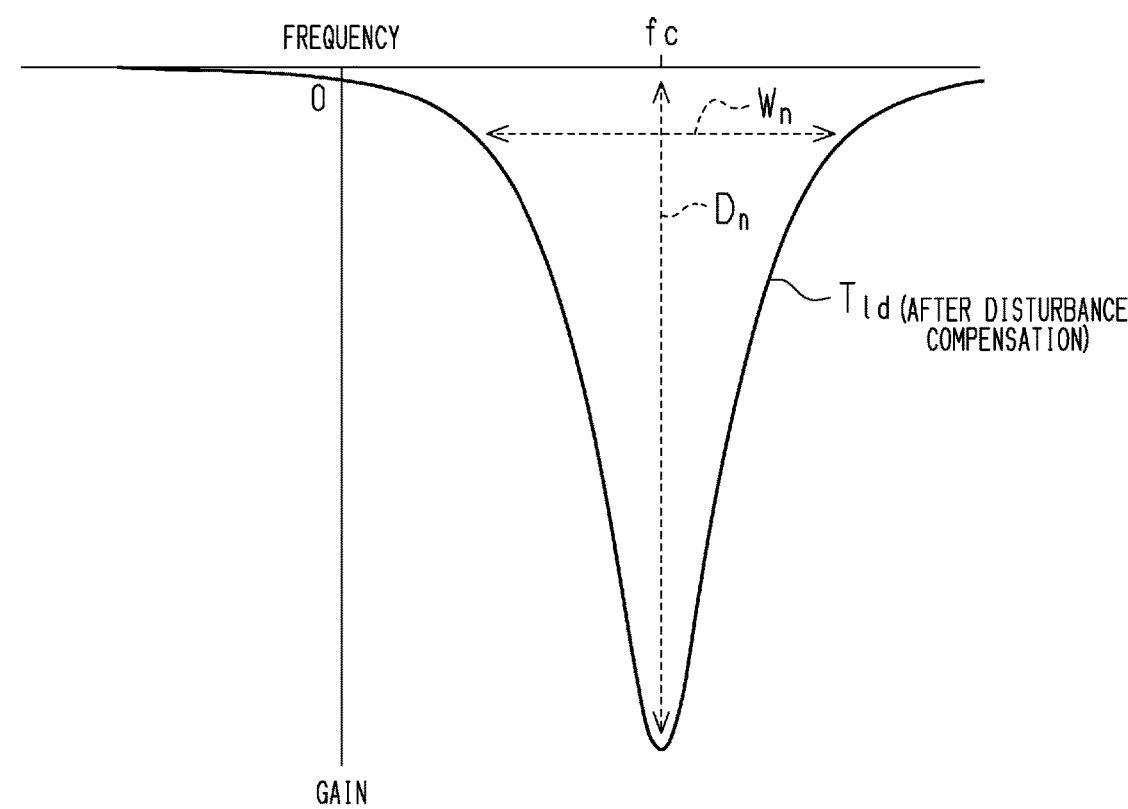
FIG. 3 is a graph showing frequency characteristics of disturbance.

As shown in the graph of FIG. 3, the post-compensation disturbance $T_{last}$ has a notch, which is a spike-like drop, in frequency characteristics thereof. The post-compensation disturbance $T_{last}$ has frequency characteristics corresponding to the antiresonance characteristics of the plant P.

The first observer gain L1 is expressed by the following Expression (4).

$$L1 = 2 \cdot \omega \cdot \alpha \qquad (4)$$

where "ω" is frequency, and "α" is a first parameter.
The second observer gain L2 is expressed by the following Expression (5).

$$L2 = J \cdot \omega^2 \qquad (5)$$

where "J" is a coefficient of inertia in which the moment of inertia of the mechanical device 13 is modeled, and "ω" is frequency.

The gain β is expressed by the following Expression (6).

$$\beta = \alpha/\omega \cdot 2 \cdot \gamma \qquad (6)$$

where "α" is a first parameter, "ω" is frequency, and "γ" is a second parameter. The second parameter γ is a value of "1" or less, and can be set, for example, in steps of "0.1".

The value of the frequency ω is set to the frequency of the disturbance $T_{ld}$ to be suppressed, and the frequency of the disturbance $T_{ld}$ to be suppressed is, for example, the center frequency fc of the notch in the disturbance $T_{ld}$.

Further, adjusting the value of the first observer gain L1 enables a width $W_n$ of the notch in the disturbance $T_{ld}$ to be adjusted. Adjusting the value of the first parameter α in Expression (4) enables the value of the first observer gain L1 to be adjusted.

Also, adjusting the value of the gain β enables a depth $D_n$ of the notch in the disturbance $T_{ld}$ to be adjusted. Adjusting the value of the second parameter γ in Expression (6) enables the value of the gain β to be adjusted.

The first observer gain L1 and the gain β are parameters that are adjusted to suppress vibrations due to the disturbance $T_{ld}$ having a specific frequency that is the object of suppression. Adjusting the value of the first observer gain L1 and the value of the gain β enables a conveyance rate of the disturbance $T_{ld}$ to the plant P to be adjusted. The value of the first observer gain L1 and the value of the gain β are adjusted so that the post-compensation disturbance $T_{last}$ has frequency characteristics corresponding to the antiresonance characteristics of the plant P. Inputting the post-compensation disturbance $T_{last}$ having frequency characteristics corresponding to the antiresonance characteristics of the plant P into the plant P theoretically enables the amplitude of vibrations of the mechanical device 13 due to the disturbance $T_{ld}$ having a specific frequency that is the object of suppression to be set to "0".

Substituting Expressions (4), (5), and (6) into the above Expression (3) yields the following Expression (7).

$$T_{last} = \{s^2 + 2 \cdot \omega \cdot \alpha \cdot (1 - \gamma) \cdot s + \omega^2\} \cdot T_{ld}/\{s^2 + 2 \cdot \omega \cdot \alpha \cdot s + \omega^2\} \qquad (7)$$

When the value of the second term "$2 \cdot \omega \cdot \alpha \cdot (1-\gamma) \cdot s$" in the curly brackets in the numerator of Expression (7) is "0", the conveyance rate of the disturbance $T_{ld}$ having the specific frequency that is the object of suppression with respect to the plant P becomes "0". Accordingly, setting the value of the second parameter γ to "1" enables the vibrations due to the disturbance $T_{ld}$ having the specific frequency that is the object of suppression to be cancelled out. Furthermore, adjusting the value of the second parameter γ between "0 and 1" in steps of "0.1", for example, enables the conveyance rate of the disturbance $T_{ld}$ having the specific frequency that is the object of suppression with respect to the plant P to be adjusted. The smaller the value of the second term "$2 \cdot \omega \cdot \alpha \cdot (1-\gamma) \cdot s$" in the curly brackets in the numerator of Expression (7) becomes, the smaller the conveyance rate of the disturbance $T_{ld}$ having the specific frequency that is the object of suppression with respect to the plant P becomes.

Note that the second term in the curly brackets in the numerator of Expression (7), "$2 \cdot \omega \cdot \alpha \cdot (1-\gamma) \cdot s$", corresponds to the second term in the curly brackets in the numerator of Expression (3), "$(-L2 \cdot \beta)+L1 \cdot J)s$". To adjust the value of the second parameter γ is also to adjust the value of the gain β.

Effects of Embodiment

According to the present embodiment, the following effects can be obtained.

(1) The disturbance observer unit 33 estimates the disturbance $T_{ld}$ using a nominal plant Pn that is a model simulating the plant P, and corrects the current command value I* based on the disturbance $T_{ld}$ that is estimated. The disturbance observer unit 33 has parameters that are adjusted to suppress vibrations due to the disturbance $T_{ld}$ having the specific frequency that is the object of suppression. Adjusting these parameters enables compensating just for the effects of the disturbance $T_{ld}$ having the specific frequency that is the object of suppression. The parameters are adjusted so that the post-compensation disturbance $T_{last}$ has frequency characteristics corresponding to the antiresonance characteristics of the plant P. Inputting the post-compensation disturbance $T_{last}$ having frequency characteristics corresponding to the antiresonance characteristics of the plant P to the plant P enables vibrations occurring in the plant P to be suppressed or canceled out.

(2) The disturbance observer unit 33 estimates the disturbance $T_{ld}$ applied to the mechanical device 13 based on the current command value I* and the angular velocity $\omega_m$ of the motor 12. Unlike in the case in which the rotation angle θ of the motor 12 is used, there is no need to calculate the midpoint of the motor 12. The midpoint of the motor 12 is the rotation angle θ of the motor 12 corresponding to the reference operating state of the mechanical device 13. Accordingly, the motor control device 11 does not need to have a function of calculating the midpoint of the motor 12.

(2) The disturbance observer unit 33 calculates the first correction value $I_{c1}$ for the current command value I* by multiplying the differential value $dT_{ld}\hat{}$ of the estimated disturbance $T_{ld}\hat{}$ by the gain β. Multiplying the differential value $dT_{ld}\hat{}$ by the gain β is all that is necessary, and accordingly the first correction value $I_{c1}$ can be easily calculated.

(3) The post-compensation disturbance $T_{last}$ that is applied to the plant P after the effects of the disturbance $T_{ld}$ have been compensated for has conveyance characteristics expressed by the following Expression (A). This is based on Expression (3) above.

$$\{Js^2 + (-L2 \cdot \beta) + L1 \cdot J)s + L2\}/\{Js^2 + (-L2 \cdot C + L1 \cdot J) s + L2\} \cdot Js \qquad (A)$$

When the value of the second term "$(-L2 \cdot B)+L1 \cdot J)s$" in the numerator of Expression (A) is "0", the conveyance rate of the disturbance $T_{ld}$ to the plant P theoretically becomes "0". Accordingly, the value of the gain β of the disturbance observer unit 33 is adjusted so that the value of the second term of the numerator of Expression (A) becomes "0" or a value closer to "0". Adjusting the value of the gain β enables the disturbance $T_{ld}$ to be suppressed more appropriately.

Other Embodiments

The present embodiment may be carried out modified as follows.

As indicated by the long dashed double-short dashed lines in FIG. 2, the disturbance observer unit 33 may have a disturbance feedback controller 33D and an adder 33E. The disturbance feedback controller 33D takes in the differential value $dT_{ld}\hat{}$ of the estimated disturbance $T_{ld}\hat{}$ calculated by the estimator 33A, and calculates a second correction value $I_{c2}$ based on the differential value $dT_{ld}\hat{}$ of the estimated disturbance $T_{ld}\hat{}$ that is taken in. The second correction value $I_{c2}$ is a current value corresponding to the estimated disturbance $T_{ld}\hat{}$ which is the difference between the actual motor output and the estimated motor output. The adder 33E calculates the final current command value I* by adding the second correction value $I_{c2}$ to the current command value I* obtained after the effects of the disturbance id are compensated for. The feedback calculation unit 32 performs feedback control of the current supplied to the motor 12 based on the final current command value I*. Thus, the value of the current supplied to the motor 12 tracks the current command value I* more quickly.

The mechanical device 13 may be an electric power steering system. The motor 12 is an assisting motor. The assisting motor generates assisting torque that is applied to the steering mechanism of the vehicle. The assisting torque is a torque for assisting steering by the steering wheel. The steering mechanism includes a steering shaft connected to steering wheels, and a turning shaft that steers the steered wheels of the vehicle. The assisting torque is applied to the steering shaft or the turning shaft. The command value calculation unit 31 calculates the current command value I* for the assisting motor, in accordance with steering torque $T_h$ detected by the torque sensor. The steering torque $T_h$ is the torque applied to the steering wheel. The steering torque $T_h$ is a state variable $S_{SV}$ indicating the steering state of the steering system.

The mechanical device 13 may be a steer-by-wire steering system. The motor 12 is a reaction force motor or a steering motor. The reaction force motor generates a steering reaction torque that is applied to the steering shaft of the vehicle. The steering reaction torque is a torque in an opposite direction of a steering direction of the steering wheel. The command value calculation unit 31 calculates the current command value I* for the reaction force motor, in accordance with steering torque $T_h$ detected by the torque sensor. The steering motor generates steering torque for steering the steered wheels of the vehicle. The command value calculation unit 31 calculates the current command value I* for the steering motor in accordance with the steering angle of the steering wheel. The steering angle is calculated, for example, based on the rotation angle θ of the motor 12 detected by the rotation angle sensor 12A. The steering torque $T_h$ and the steering angle are the state variable $S_{SV}$ indicating the steering state of the steering system.

As indicated by the long dashed double-short dashed lines in FIG. 2, when the motor 12 is an assisting motor or a reaction force motor, the motor control device 11 may be configured as follows. That is to say, the motor control device 11 has a compensator 34 and a multiplier 35. The compensator 34 calculates a torque differential value by differentiation of the steering torque $T_h$ detected by the torque sensor, and calculates a compensation amount $dT_{ca}$ for compensating for the effects of the disturbance $T_{ld}$ in accordance with the torque differential value that is calculated. The multiplier 35 calculates a third correction value $I_{c3}$ by multiplying the compensation amount $dT_{ca}$ by the gain β. The third correction value $I_{c3}$ is a current value. The subtractor 33C adds the third correction value $I_{c3}$ to the current command value I*. This increases responsiveness of the motor torque as to changes in the steering torque $T_h$. Thus, a smoother steering feel can be obtained. Also, advantages of suppressing disturbances, such as reverse input vibration from the steered wheels, brake vibrations generated due to brake operations, and so forth, can also be obtained.

When the mechanical device 13 is a steering system of a vehicle, and the motor 12 is an assisting motor or a reaction force motor, the disturbance observer unit 33 may be configured as follows. That is to say, the disturbance observer unit 33 may stop disturbance compensation control, which is control for compensating for the effects of the disturbance $T_{ld}$, in a state in which vibrations due to torque ripple of the motor 12 are unlikely to appear in the steering system. For example, vibrations due to torque ripple are easily conveyed to the steering system when the vehicle speed is an extremely low speed. Accordingly, the disturbance observer unit 33 may stop the disturbance compensation control when a value of the vehicle speed exceeds a vehicle speed threshold. The speed threshold is a standard for determining whether the vehicle speed is an extremely low speed. Also, vibrations due to torque ripple are easily conveyed to the steering system when the angular velocity $\omega_m$ of the motor 12 is extremely slow. Accordingly, the disturbance observer unit 33 may stop the disturbance compensation control when a value of the angular velocity $\omega_m$ exceeds an angular velocity threshold. The angular velocity threshold is a standard for when determining whether the angular velocity $\omega_m$ of the motor 12 is extremely slow. The angular velocity $\omega_m$ of the motor 12 reflects the steering speed of the steering wheel.

The motor control device 11 may have a function of detecting an abnormality in itself, an abnormality in the motor 12, or an abnormality in the mechanical device 13. In this case, the disturbance observer unit 33 may stop the disturbance compensation control when an abnormality in the motor control device 11, the motor 12, or the mechanical device 13, is detected. Executing compensation control when an abnormality is detected in the motor control device 11, the motor 12, or the mechanical device 13, is meaningless.

The command value calculation unit 31 may be configured as follows. That is to say, an arrangement may be made in which the command value calculation unit 31 calculates a torque command value based on the state variable $S_{SV}$ indicating the state of the mechanical device 13, and calculates the current command value I* based on this torque command value that is calculated. The torque command value is the torque that the motor 12 is to be caused to generate. In this case, the estimator 33A takes in the torque command value and the angular velocity $\omega_m$ of the motor 12, which is the output of the plant P. The estimator 33A calculates the differential value $dT_{ld}\hat{}$ of the estimated disturbance $T_{ld}\hat{}$ based on the torque command value and the angular velocity $\omega_m$ of the motor 12. The multiplier 33B calculates a torque correction value by multiplying the differential value $dT_{ld}\hat{}$ of the estimated disturbance $T_{ld}\hat{}$ by a predetermined gain. The torque correction value is a correction value for the torque command value. The subtractor 33C corrects the torque command value by subtracting the torque correction value from the torque command value. In this arrangement as well, the effects of the disturbance $T_{ld}$ having the frequency that is the object of suppression can be compensated for.

The disturbance observer unit 33 may be configured as follows. That is to say, the disturbance observer unit 33 may calculate the difference between the rotation angle $\theta$ of the motor 12 obtained as the output of the plant P and the estimated rotation angle of the motor 12 obtained as the output of the nominal plant Pn, and compensate for the effects of the disturbance $T_{ld}$ based on the difference value that is calculated in this way. The rotation angle $\theta$ of the motor 12 is rotation information of the motor 12.

The mechanical device 13 is not limited to being a vehicle steering system. The mechanical device 13 may be a machine tool driven by a motor, for example.

The invention claimed is:

1. A motor control device that controls a motor of a mechanical device, the motor control device comprising:

a first processing circuit configured to calculate a command value for controlling the motor; and a second processing circuit configured to estimate a disturbance applied to the mechanical device, based on the command value and rotation information of the motor, and to correct the command value by reflecting the disturbance that is estimated, wherein the second processing circuit has a parameter that is adjusted to compensate for effects of the disturbance having a specific frequency that is an object of suppression, the disturbance that is applied to the mechanical device, after the effects of the disturbance have been compensated by reflecting the disturbance estimated by the second processing circuit, is a post-compensation disturbance, and the parameter is adjusted such that the post-compensation disturbance has a frequency characteristic corresponding to an antiresonance characteristic that appears in control of the motor in the mechanical device.

2. The motor control device according to claim 1, wherein the rotation information of the motor is an angular velocity of the motor.

3. The motor control device according to claim 2, wherein the second processing circuit is configured to calculate a differential value of the disturbance based on the command value and the angular velocity of the motor, and calculate a first correction value for the command value by multiplying, by a gain, the differential value of the disturbance that is calculated.

4. The motor control device according to claim 3, wherein with "J" as a coefficient of inertia of the mechanical device, "C" as a viscosity coefficient of the mechanical device, "s" as a Laplace operator, "L1" as a first observer gain of the second processing circuit, "L2" as a second observer gain of the second processing circuit, and "$\beta$" as the gain, the post-compensation disturbance has conveyance characteristics expressed by the following Expression (A) $\{Js^2+(-L2\cdot\beta)+L1\cdot J)s+L2\}/\{Js^2+(-L2\cdot C+L1\cdot J)s+L2\}\cdot Js$ . . . (A), and a value of "$\beta$" that is the gain is adjusted such that a value of a second term of a numerator of Expression (A) becomes zero or a value closer to zero.

5. The motor control device according to claim 2, wherein the second processing circuit is configured to calculate a differential value of the disturbance based on the command value and the angular velocity of the motor, and calculate a second correction value for the command value based on the differential value of the disturbance that is calculated.

6. The motor control device according to claim 1, wherein:

the mechanical device is configured to also operate due to torque being applied externally; and the second processing circuit is configured to calculate a compensation amount for compensating for the effects of the disturbance in accordance with a differential value of the torque externally applied to the mechanical device, and calculate a third correction value for the command value based on the compensation amount that is calculated.

7. The motor control device according to claim 1, wherein:

the mechanical device is a steering system of a vehicle; and the motor generates a torque that is applied to the steering system.

\* \* \* \* \*